US011329693B2

(12) United States Patent
Sun et al.

(10) Patent No.: US 11,329,693 B2
(45) Date of Patent: *May 10, 2022

(54) DYNAMIC MEDIUM SWITCH IN CO-LOCATED PLC AND RF NETWORKS

(71) Applicant: Texas Instruments Incorporated, Dallas, TX (US)

(72) Inventors: Yanjun Sun, Richardson, TX (US); Gang Xu, Allen, TX (US); Soon-Hyeok Choi, Allen, TX (US); Bhadra Sandeep, Dallas, TX (US); Xiaolin Lu, Plano, TX (US); Ariton E. Xhafa, Plano, TX (US); Minghua Fu, Plano, TX (US); Robert W. Liang, Frisco, TX (US); Susan Yim, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/823,927

(22) Filed: Mar. 19, 2020

(65) Prior Publication Data

US 2020/0220574 A1 Jul. 9, 2020

Related U.S. Application Data

(63) Continuation of application No. 14/878,178, filed on Oct. 8, 2015, now Pat. No. 10,644,750, which is a
(Continued)

(51) Int. Cl.
*H04B 3/54* (2006.01)
*H04B 1/12* (2006.01)
(Continued)

(52) U.S. Cl.
CPC .............. *H04B 3/54* (2013.01); *H04B 1/123* (2013.01); *H04B 1/401* (2013.01); *H04B 3/30* (2013.01);
(Continued)

(58) Field of Classification Search
CPC ... H04B 3/30; H04B 3/36; H04B 3/54; H04B 1/123; H04B 1/401; H04B 2203/5441; H04B 2203/5495
See application file for complete search history.

(56) References Cited

U.S. PATENT DOCUMENTS 4,597,082 A 6/1986 Hill et al.
5,471,146 A * 11/1995 Krayeski .............. H04B 17/318
324/637

(Continued)

FOREIGN PATENT DOCUMENTS

EP 2234338 A1 3/2009
WO 2011073677 A1 6/2011

*Primary Examiner* — James M Perez
(74) *Attorney, Agent, or Firm* — Charles F. Koch; Charles A. Brill; Frank D. Cimino

(57) ABSTRACT

An electronic communication device comprises a first transceiver capable of a bi-directional communication session on a first communication medium; a second transceiver capable of a bi-directional communication session on a second communication medium; and a control logic coupled to the first transceiver and the second transceiver and capable of implementing a convergence layer, wherein the control logic is configured to receive, from the first transceiver, a first signal; and cause, in response to the first signal, data received and transmitted by the first transceiver on the first communication medium as part of a communication session to be received and transmitted instead by the second transceiver on the second communication medium.

20 Claims, 2 Drawing Sheets

Related U.S. Application Data continuation of application No. 13/553,182, filed on Jul. 19, 2012, now Pat. No. 9,184,779.

(60) Provisional application No. 61/510,584, filed on Jul. 22, 2011.

(51) Int. Cl.
    *H04B 3/30*     (2006.01)
    *H04B 3/36*     (2006.01)
    *H04B 1/401*     (2015.01)

(52) U.S. Cl.
    CPC ....... *H04B 3/36* (2013.01); *H04B 2203/5441* (2013.01); *H04B 2203/5495* (2013.01)

(56) References Cited

U.S. PATENT DOCUMENTS

| | | | | |
|---|---|---|---|---|
| 5,475,677 | A * | 12/1995 | Arnold | H04B 1/005 370/280 |
| 5,477,532 | A * | 12/1995 | Hoshigami | H04B 1/109 370/277 |
| 6,023,615 | A * | 2/2000 | Bruckert | H04B 7/082 348/14.08 |
| 6,108,472 | A | 8/2000 | Rickman et al. | |
| 6,151,173 | A | 11/2000 | Massit et al. | |
| 6,329,139 | B1 | 12/2001 | Nova et al. | |
| 6,965,303 | B2 * | 11/2005 | Mollenkopf | H04B 3/54 307/3 |
| 7,064,654 | B2 * | 6/2006 | Berkman | H04B 3/54 340/12.3 |
| 7,519,811 | B1 * | 4/2009 | Hara | H04H 60/93 713/151 |
| 7,564,840 | B2 * | 7/2009 | Elliott | H04L 65/605 370/356 |
| 7,853,238 | B1 * | 12/2010 | Dianda | H04W 92/20 455/402 |
| 8,032,107 | B1 * | 10/2011 | Beard | H04W 52/0229 455/343.3 |
| 8,103,277 | B2 * | 1/2012 | Wee | H04W 36/0066 455/436 |
| 8,467,734 | B2 * | 6/2013 | Schubert | H04B 3/542 455/66.1 |
| 8,705,527 | B1 * | 4/2014 | Addepalli | H04L 61/2592 370/389 |
| 8,792,573 | B2 * | 7/2014 | Kim | H04W 52/40 375/261 |
| 8,798,117 | B1 * | 8/2014 | Campbell | H04B 7/0814 375/148 |
| 8,817,847 | B2 * | 8/2014 | Sun | H04B 3/54 375/211 |
| 8,976,850 | B2 * | 3/2015 | Clerckx | H04B 7/0626 375/228 |
| 9,131,426 | B2 * | 9/2015 | Kimura | H04L 45/125 |
| 9,184,779 | B2 * | 11/2015 | Sun | H04B 1/401 |
| 9,379,773 | B2 * | 6/2016 | Vijayasankar | H04B 3/54 |
| 9,385,752 | B2 * | 7/2016 | Loghin | H03M 13/3761 |
| 9,602,161 | B2 * | 3/2017 | Sun | H04B 3/54 |
| 9,692,630 | B2 * | 6/2017 | Qi | H04L 1/007 |
| 9,998,175 | B2 * | 6/2018 | Sun | H04B 3/54 |
| 10,050,878 | B2 * | 8/2018 | Pande | H04L 47/2458 |
| 10,063,369 | B1 | 8/2018 | Murphy | G01D 21/02 |
| 10,110,352 | B2 * | 10/2018 | Qi | H04L 1/0046 |
| 10,256,942 | B2 * | 4/2019 | Zoellner | H04H 20/423 |
| 10,270,492 | B2 * | 4/2019 | Sun | H04B 3/56 |
| 10,313,928 | B2 * | 6/2019 | Kim | H04W 52/0258 |
| 10,333,759 | B2 * | 6/2019 | Qi | H04L 1/0046 |
| 10,419,066 | B1 * | 9/2019 | Bonen | H04B 3/08 |
| 10,461,809 | B2 * | 10/2019 | Merrick | H05B 47/185 |
| 10,644,750 | B2 * | 5/2020 | Sun | H04B 3/36 |
| 10,693,778 | B2 * | 6/2020 | Pande | H04L 45/70 |
| 10,798,433 | B2 * | 10/2020 | Major | H04N 21/2187 |
| 10,849,017 | B2 * | 11/2020 | Kim | H04W 28/08 |
| 11,128,554 | B1 * | 9/2021 | Wang | H04W 72/12 |
| 2002/0030649 | A1 | 3/2002 | Zavracky et al. | |
| 2002/0172188 | A1 | 11/2002 | Wunsch | |
| 2003/0204660 | A1 | 10/2003 | Saito et al. | |
| 2004/0066283 | A1 | 4/2004 | Manis et al. | |
| 2004/0090312 | A1 * | 5/2004 | Manis | H04B 3/54 370/464 |
| 2004/0110483 | A1 * | 6/2004 | Mollenkopf | H04B 3/56 455/402 |
| 2004/0135676 | A1 * | 7/2004 | Berkman | H04B 3/54 370/464 |
| 2004/0143428 | A1 | 7/2004 | Rappaport et al. | |
| 2004/0208255 | A1 * | 10/2004 | Yoshida | H04L 27/2626 375/260 |
| 2005/0117566 | A1 * | 6/2005 | Davidson | H04M 1/725 370/352 |
| 2005/0194217 | A1 | 9/2005 | Smith et al. | |
| 2006/0073850 | A1 * | 4/2006 | Cha | H04B 7/0608 455/562.1 |
| 2006/0153122 | A1 * | 7/2006 | Hinman | H04L 67/04 370/328 |
| 2006/0172711 | A1 * | 8/2006 | King | H04B 7/061 455/101 |
| 2007/0015536 | A1 * | 1/2007 | LaBauve | H04L 29/06027 455/552.1 |
| 2007/0032220 | A1 * | 2/2007 | Feher | H04L 27/2601 455/404.1 |
| 2007/0061266 | A1 | 3/2007 | Moore et al. | |
| 2007/0167144 | A1 | 7/2007 | Koga et al. | |
| 2008/0063156 | A1 * | 3/2008 | Grohn | H04M 1/27475 379/88.16 |
| 2008/0086662 | A1 * | 4/2008 | Li | H04L 1/0009 714/704 |
| 2008/0170540 | A1 | 7/2008 | Fukuda | |
| 2008/0244676 | A1 * | 10/2008 | DaCosta | H04N 21/8352 725/116 |
| 2008/0287080 | A1 * | 11/2008 | Camp, Jr. | H04B 1/406 455/127.5 |
| 2008/0288024 | A1 * | 11/2008 | Abrahamson | H01Q 1/22 607/60 |
| 2009/0016245 | A1 * | 1/2009 | Karls | H04W 88/06 370/310 |
| 2009/0146838 | A1 * | 6/2009 | Katz | G01D 4/006 340/870.02 |
| 2009/0190582 | A1 * | 7/2009 | Nambiath | H04L 65/4084 370/389 |
| 2009/0257752 | A1 | 10/2009 | Yeh et al. | |
| 2009/0319663 | A1 * | 12/2009 | Giles | H04L 69/14 709/226 |
| 2010/0009674 | A1 * | 1/2010 | Sapkota | H04L 65/1093 455/426.1 |
| 2010/0083121 | A1 * | 4/2010 | Famolari | H04L 69/18 715/736 |
| 2010/0109864 | A1 * | 5/2010 | Haartsen | G01S 5/0236 340/539.13 |
| 2010/0177080 | A1 * | 7/2010 | Essinger | H04L 12/66 345/211 |
| 2010/0234071 | A1 * | 9/2010 | Shabtay | H04B 7/155 455/562.1 |
| 2010/0285732 | A1 * | 11/2010 | Sinton | H04H 20/26 455/3.01 |
| 2010/0329247 | A1 * | 12/2010 | Kennedy | H04L 12/66 370/389 |
| 2011/0002295 | A1 * | 1/2011 | Ghosal | H04W 36/0055 370/331 |
| 2011/0043614 | A1 * | 2/2011 | Kitazato | H04N 21/4345 348/51 |
| 2011/0051721 | A1 | 3/2011 | Brothwell | |
| 2011/0197085 | A1 | 8/2011 | Wu | |
| 2011/0205918 | A1 | 8/2011 | Hurwitz | |
| 2012/0029714 | A1 | 2/2012 | Brian et al. | |
| 2012/0036220 | A1 * | 2/2012 | Dare | H04L 67/04 709/217 |
| 2012/0250510 | A1 | 10/2012 | He | |
| 2012/0320932 | A1 * | 12/2012 | Xu | H04L 69/22 370/474 |

(56) References Cited

U.S. PATENT DOCUMENTS

| | | | |
|---|---|---|---|
| 2013/0051446 A1* | 2/2013 | Vijayasankar | H04B 3/54 375/224 |
| 2013/0121427 A1* | 5/2013 | Sun | H04B 3/54 375/257 |
| 2013/0188670 A1* | 7/2013 | Sun | H04B 3/54 375/211 |
| 2013/0188673 A1* | 7/2013 | Sun | H04B 1/123 375/219 |
| 2013/0254828 A1* | 9/2013 | Reimers | H04N 21/44209 725/134 |
| 2013/0260820 A1* | 10/2013 | Schmandt | H04W 76/28 455/553.1 |
| 2013/0279552 A1 | 10/2013 | Gomez Martinez et al. | |
| 2015/0046703 A1* | 2/2015 | Liang | H04W 4/80 713/162 |
| 2015/0046704 A1* | 2/2015 | Liang | H04W 12/02 713/162 |
| 2015/0110229 A1* | 4/2015 | Kim | H04B 7/082 375/347 |
| 2015/0280861 A1* | 10/2015 | Qi | H03M 13/6522 714/776 |
| 2016/0028438 A1* | 1/2016 | Sun | H04B 3/54 375/219 |
| 2020/0220574 A1* | 7/2020 | Sun | H04B 3/36 |

\* cited by examiner

DYNAMIC MEDIUM SWITCH IN CO-LOCATED PLC AND RF NETWORKS

CROSS-REFERENCE TO RELATED APPLICATION

The present application is a continuation of U.S. patent application Ser. No. 14/878,178 filed Oct. 8, 2015, which is a continuation of U.S. patent application Ser. No. 13/553,182 filed Jul. 19, 2012, now U.S. Pat. No. 9,184,779 issued Nov. 10, 2015, which, claims priority to U.S. Provisional Patent Application No. 61/510,584 filed on Jul. 22, 2011, which applications are hereby incorporated herein by reference in their entireties.

BACKGROUND

Narrow-band power line communication (PLC) transceivers and low-power radio frequency (RF) transceivers may be used in sensor networks and smart grid networks. Transceivers are able to transmit and receive data; thus, they may be referred to as bi-directional communication devices. Noise such as wireless local area network (WLAN) transmissions may interfere with RF transmissions, and impulsive noises from appliances such as washing machines may interfere with PLC transmissions. As PLC, RF, and other technologies proliferate, embedded devices may incorporate a combination of PLC, RF, and other technologies to improve network connectivity. For example, some smart meters may incorporate a PLC transceiver and an 802.15.4 RF transceiver. Because such devices operate on multiple types of networks, they may be referred to as hybrid devices.

SUMMARY

In some embodiments, an electronic communication device is disclosed as comprising a first transceiver capable of a bi-directional communication session on a first communication medium; a second transceiver capable of a bi-directional communication session on a second communication medium; and a control logic coupled to the first transceiver and the second transceiver and capable of implementing a convergence layer, wherein the control logic is configured to receive, from the first transceiver, a first signal; and cause, in response to the first signal, data to be received and transmitted by the first transceiver on the first communication medium as part of a communication session to be received and transmitted instead by the second transceiver on the second communication medium.

In other embodiments, a method for electronic communication is disclosed as comprising providing a first transceiver capable of a bi-directional communication session on a first communication medium, a second transceiver capable of a bi-directional communication session on a second communication medium, and a control logic coupled to the first transceiver and the second transceiver and capable of implementing a convergence layer; receiving, by the control logic from the first transceiver, a first signal; and causing, by the control logic in response to the first signal, data to be received and transmitted by the first transceiver on the first communication medium as part of a communication session to be received and transmitted instead by the second transceiver on the second communication medium.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name, but not function. In the following discussion and in the claims, the terms "including" and "comprising" are used in an open-ended fashion and thus should be interpreted to mean "including, but not limited to . . . ." Also, the terms "couple" and its variations are intended to mean either an indirect or direct electrical connection; thus, if a first device couples to a second device, that connection may be through a direct electrical connection or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

PLC generally refers to communication of data on a conductor that is also used to carry alternating current (AC) electrical power, for example, power lines delivering electrical power at about 110 VAC at 60 Hz or about 220 VAC at 50 Hz. PLC communication may be on a power line that is distributing power at a stepped down voltage to residential buildings or within a building such as an office building. In some cases, PLC may not propagate across distribution transformers, for example across step-down transformers, without some form of signal processing to bridge across the two sides or windings of the subject transformer. PLC technologies include PoweRline Intelligent Metering Evolution (PRIME), G3, and Institute of Electrical and Electronics Engineers (IEEE) 1901.2. RF communication generally refers to communication of data on radio waves in the frequency range of 3 kHz to 300 GHz. RF technologies include Zigbee, WLAN of Wi-Fi, and Bluetooth.

Figure 1:
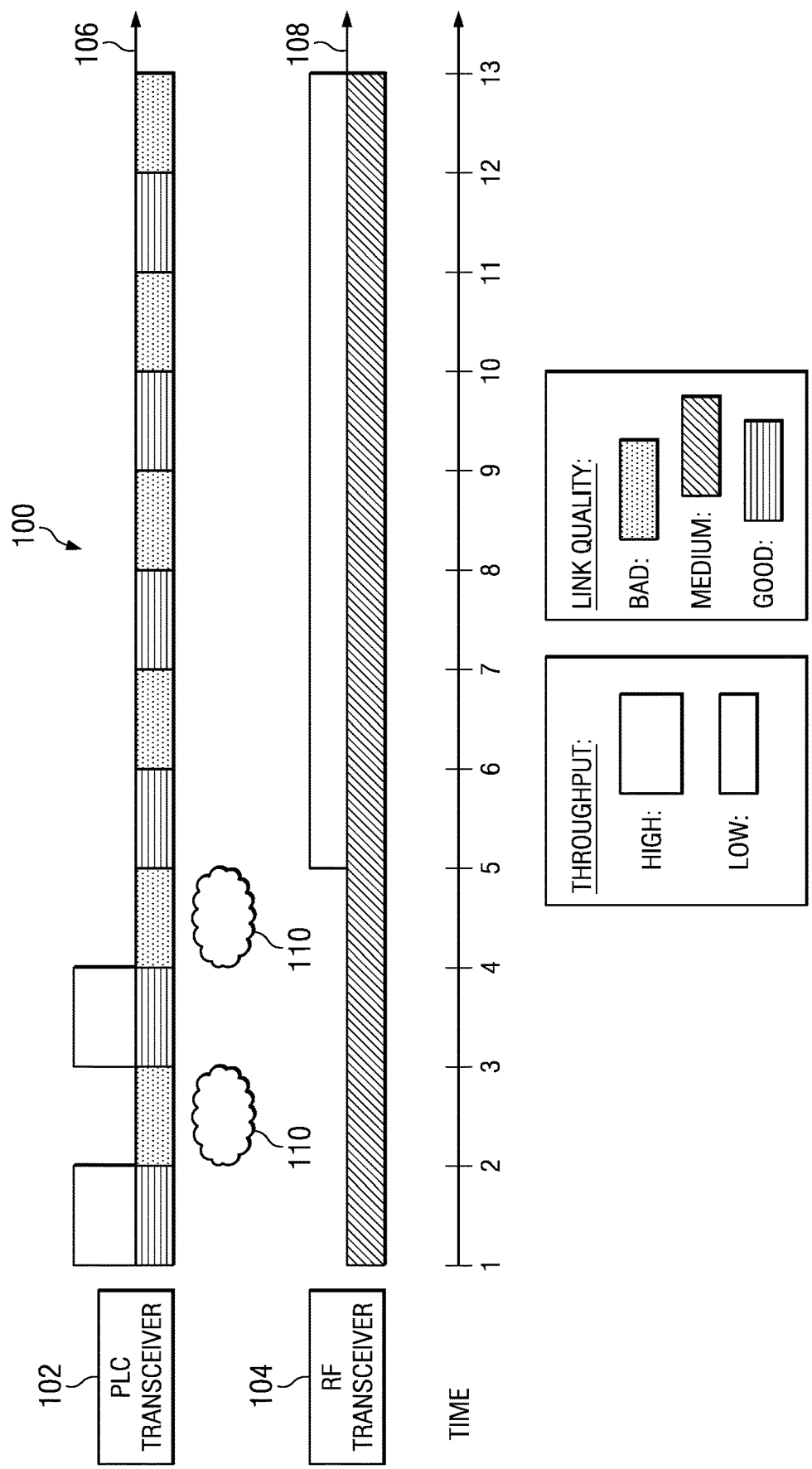
FIG. 1 shows a system of communication between two electronic communication devices.

FIG. 1 shows a system 100 of communication between two electronic communication devices. The system 100 may comprise a PLC transceiver 102 and an RF transceiver 104, which may communicate with peer transceivers over time. The PLC transceiver 102 and the RF transceiver 104 may be incorporated into the same device, which may therefore be referred to as a hybrid device. The device may be a smart meter where the PLC transceiver is a narrow-band PLC transceiver and the RF transceiver is an 802.15.4 RF transceiver. Alternatively, the device may be a device other than a smart meter. The system 100 may employ a typical routing protocol, such as an IPv6 routing protocol for low power and lossy networks (RPL), for the transceivers 102, 104.

At time 1, the PLC transceiver 102 may initiate a communication session over a PLC link 106 with good link quality. Accordingly, the device may achieve high throughput over the PLC link 106.

The word "link" may be interchanged with the word "medium." The term "communication session" and its variations may be understood broadly to refer to any ongoing communication between two devices. A communication session need not be associated with any particular communication layer, but may instead refer to a communication activity that has duration in time and comprises a plurality of packets that are abstracted as parts of the communication or communication session. A communication session may comprise, for example, a smart meter transmitting a monthly power usage report in response to a request. The monthly usage report may comprise usage data and metrics on service quality.

At time 2, an electrical or electromagnetic noise 110 may occur near the system 100. If the noise 110 is an impulsive noise from an appliance such as a washing machine, then the noise 110 may affect PLC communication, but not RF communication. Accordingly, the PLC link 106 may exhibit bad link quality, the device may achieve nominal or no throughput over the PLC link 106, and the communication session may pause.

At time 3, the noise 110 may dissipate, thus restoring the PLC link quality. With the PLC link quality restored, the routing protocol associated with the transceivers 102, 104 may therefore choose not to switch media from the PLC link 106 to the RF link 108, and the communication session may resume over the PLC link 106 with high throughput.

At time 4, the noise 110 may reemerge and once again cause bad link quality over the PLC link 106. This time, however, the routing protocol may choose to route the communication session over the RF link 108, but there may be a lag before the routing protocol can initiate the communication session on the RF link 108.

At time 5, the communication session may initiate the communication session on the RF link 108. The RF link 108 may, however, exhibit medium link quality and low throughput relative to the PLC link 106 throughput. In addition, the routing layer, if left unimpeded, may continue the communication session on the RF link 108 for the duration of the communication session, in this case until time 13, instead of switching back to the PLC link 106 as link conditions improve. When performing its various functions, the routing layer may update various routing tables and therefore consume network bandwidth.

Figure 2:
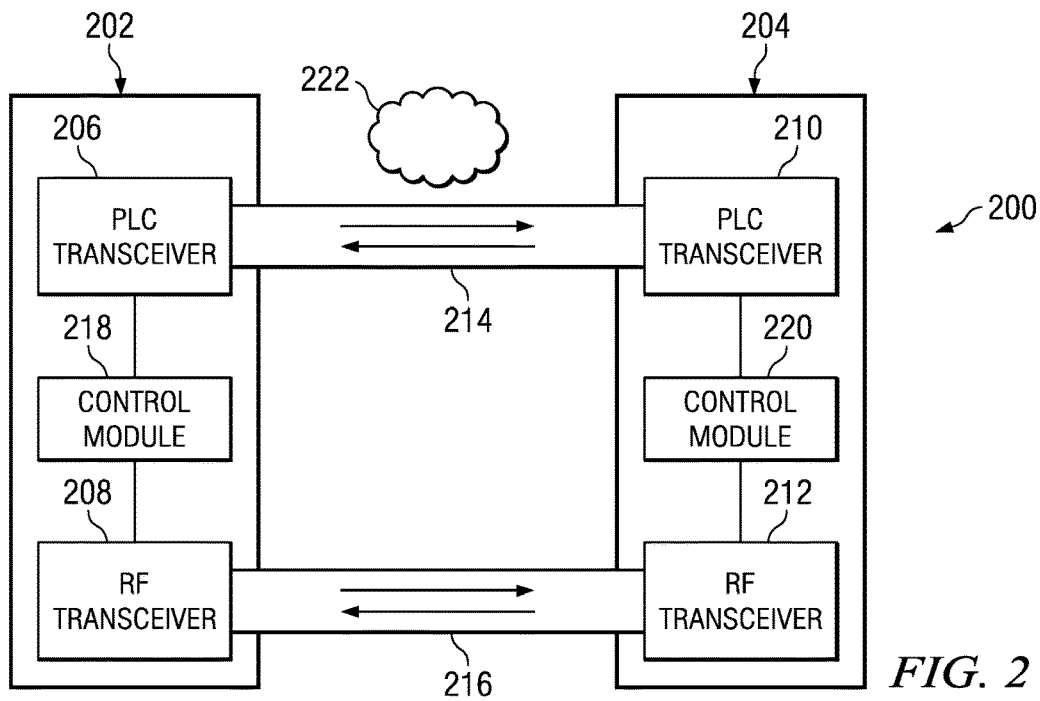
FIG. 2 shows a system of communication between two electronic devices according to an embodiment of the disclosure.

FIG. 2 shows a system of communication 200 between a first electronic communication device 202 and a second electronic communication device 204 according to an embodiment of the disclosure. The first device 202 may comprise a first PLC transceiver 206, a first RF transceiver 208, and a first control module 218. The second device may comprise a second PLC transceiver 210, a second RF transceiver 212, and a second control module 220. The first PLC transceiver 206, the first RF transceiver 208, and the first control module 218 may be implemented as a single integrated circuit or as a system on a chip (SOC). Likewise, the second PLC transceiver 210, the second RF transceiver 212, and the second control module 220 may be implemented as a single integrated circuit or as an SOC. Alternatively, the control modules 218, 220 may be implemented separately from the transceivers 206, 208, 210, 212.

The devices 202, 204 may be referred to as hybrid devices. In an embodiment, the devices 202, 204 may be smart meters where the first PLC transceiver 206 and the second PLC transceiver 210 are narrow-band PLC transceivers and the first RF transceiver 208 and the second RF transceiver 212 are 802.15.4 RF transceivers. Alternatively, the first device 202 may be a smart meter, and the second device 204 may be a monitor or data gathering device that promotes collecting usage reports from a plurality of smart meters and forwarding them to a centralized processing point of a power distribution company. Smart meters typically refer to electrical meters that record information related to consumption of electric energy. Smart meters typically comprise real-time or near real-time sensors and provide power outage notification and power quality monitoring. Smart meters may provide that information to a central system associated with a power provider. Smart meters may also communicate with each other in high-density population areas or otherwise using collaborative network technology. The devices 202, 204 may comprise transceivers employing other technologies as well. In another embodiment, the devices 202, 204 may not be smart meters, but instead may be other devices.

The first PLC transceiver 206 and the second PLC transceiver 210 may communicate with each other over a PLC link 214. A PLC link may refer to the power line or conductor itself that provides communication of data along with AC electrical power. Likewise, the first RF transceiver 208 and the second RF transceiver 212 may communicate with each other over an RF link 216.

The control modules 218, 220 may communicate with their respective transceivers 206, 208, 210, 212. The control modules 218, 220 may each be executed by a separate processor associated with their respective devices 202, 204. The control modules 218, 220 may each monitor, receive, process, and distribute data from their respective transceivers 206, 208, 210, 212 and links 214, 216 and may do so through at least one sub-module. The data may relate to received signal strength indication (RSSI), noise level, medium occupation ratio, statistics on packet error rates with different modulation schemes, and which packets have a valid preamble but an invalid payload cyclic redundancy check (CRC). The data may enable the control modules 218, 220 to make local decisions such as medium selection and rate control. When the devices 202, 204 are described below as monitoring, receiving, processing, distributing, or performing similar functions, it may be understood that they are doing so through their respective control modules 218, 220. The control modules 218, 220 may also each cause changes in communication behavior among their respective transceivers 206, 208, 210, 212 and links 214, 216 and may do so through at least one other sub-module. When the devices 202, 204 are described below as causing changes in communication behavior or performing similar functions, it may be understood that they are doing so through their respective control modules 218, 220. In some contexts, the control modules 218, 220 may be referred to as control logic.

The devices 202, 204 may each employ a new protocol layer, a convergence layer, and may do so through their respective control modules 218, 220. The convergence layer may operate between its respective routing layer and media access control (MAC) layer and thus provide a new protocol layer. In that respect, the convergence layer may filter information before that information reaches its respective routing layers. The convergence layer may, for instance, monitor transmission failures and delays.

The system 200 may initiate a communication session from the first device 202 to the second device 204 across the PLC link 214, but preferably not across the RF link 216. Under some conditions, the PLC link 214 may support higher throughput and/or a higher communication rate than the RF link 216. The PLC link 214, when the transceivers 206, 210 communicate to and from each other, may be referred to as operating in a full duplex mode of operation.

The communication session may comprise a series of packet transmissions from the first device 202 to the second device 204 and a series of acknowledgments from the second device 204 to the first device 202. Alternatively, the communication session may comprise a series of packet transmissions from the second device 204 to the first device 202 and a series of acknowledgments from the first device 202 to the second device 204. Electrical or electromagnetic noise 222 may occur near the system 200. As mentioned above, if the noise 222 is an impulsive noise from an appliance such as a washing machine, then the noise 222 may affect PLC communication, but not RF communication. If the second device 204 fails to reply with an acknowledgment after a threshold number of packet transmission attempts from the first device 202, and if the RF link 216 is available, then the convergence layer associated with the first device 202 may choose to employ the RF link 216 to send a query to the second device 204 to determine its link conditions. The convergence layer may transmit the unsent packet with the query in a single transmission to the second device 204 over the RF link 216. The second device 204 may then respond over the RF link 216 with information regarding the link conditions that it is observing. For example, the second device 204 may indicate that the noise 222 is too great for packet transmissions over the PLC link 214. The second device 204 may observe and report those link conditions from the second control module 220. If the convergence layer does not obtain the requested information from the second device 204 over the RF link 216, then the convergence layer may wait until a predefined timeout occurs. After the timeout, the convergence layer may determine that the second device 204 is inoperable or that the RF link 216 is invalid, then provide to its routing layer that information along with the failed packet itself.

Otherwise, if the information from the second device 204 indicates that the noise 222 is merely temporal and that the RF link 216 is an acceptable medium, then the convergence layer may discontinue the communication session in the PLC link 214 and initiate a communication session in the RF link 216. The communication session in the RF link 216 may resume the communication session from the PLC link 214. The system 200 may employ a handshake process in order to transition the communication session from the PLC link 214 to the RF link 216. The convergence layer may place a time limit on the use of the RF link 216 for the communication session. After that time limit expires, the convergence layer may notify its routing layer of any packet transmission failures. If the RF link 216 is also degraded, then the convergence layer may immediately notify its routing layer of that degradation.

If the communication quality improves in the PLC link 214, then the convergence layer may choose to discontinue the communication session in the RF link 216 and re-initiate that communication session in the PLC link 214. Once again, the system 200 may employ a handshake process, this time to transition the communication session from the RF link 216 to the PLC link 214. The system 200 may prefer to return to the PLC link 214 communication due to, for example, a higher throughput in PLC communication compared to RF communication.

While a switch from the PLC link 214 to the RF link 216 is described above, the system 200 may instead choose to switch from the RF link 216 to the PLC link 214, depending on link conditions and other factors. The subsequently described embodiments may also permit such link flexibility. In addition to the dynamic medium switch when one transceiver is experiencing temporal interference, the system 200 may employ both the PLC link 214 and the RF link 216 when one transceiver is experiencing bursts of traffic loads. When a packet queue size at one transceiver exceeds a threshold, the system 200 may split traffic between the PLC link 214 and the RF link 216. Furthermore, the convergence layer associated with each device 202, 204 may answer incoming requests from other nodes or devices and provide information indicating that multiple transceivers belong to their respective devices.

Finally, as mentioned above, the first control module 228 and the second control module 220 may observe and report information to the first device 202 and the second device 204, respectively. That information may facilitate proper medium selection. In a first example, if packet transmissions from the first device 202 to the second device 204 repeatedly fail, but the noise level and medium occupation ratio are low across the medium in use, then it is more likely that the second device 204 is experiencing problems, so the convergence layer associated with the first device 202 may attempt to retrieve information related to conditions at the second device 204. In a second example, if packet transmissions from the first device 202 to the second device 204 repeatedly fail, but the noise level across the medium in use is above a predefined threshold, then the second device 204 may report link noise to the first device 202. In a third example, if the first device 202 is sending packets to the second device 204 and if the number of packets with a valid preamble but an invalid payload CRC is large, then the second device 204 may report that a modulation scheme might be too aggressive. The second device 204 may send a similar report based on packet error rates with different modulation schemes or based on a low medium occupation ratio. In a fourth example, if the first device 202 is sending packets to the second device 204 and if there is a high medium occupation ratio and a small number of detected preambles, then the second device 204 may suggest that line noise or hidden node transmissions are causing transmission failures, and the second device 204 may suggest that an alternative medium should be used.

Figure 3:
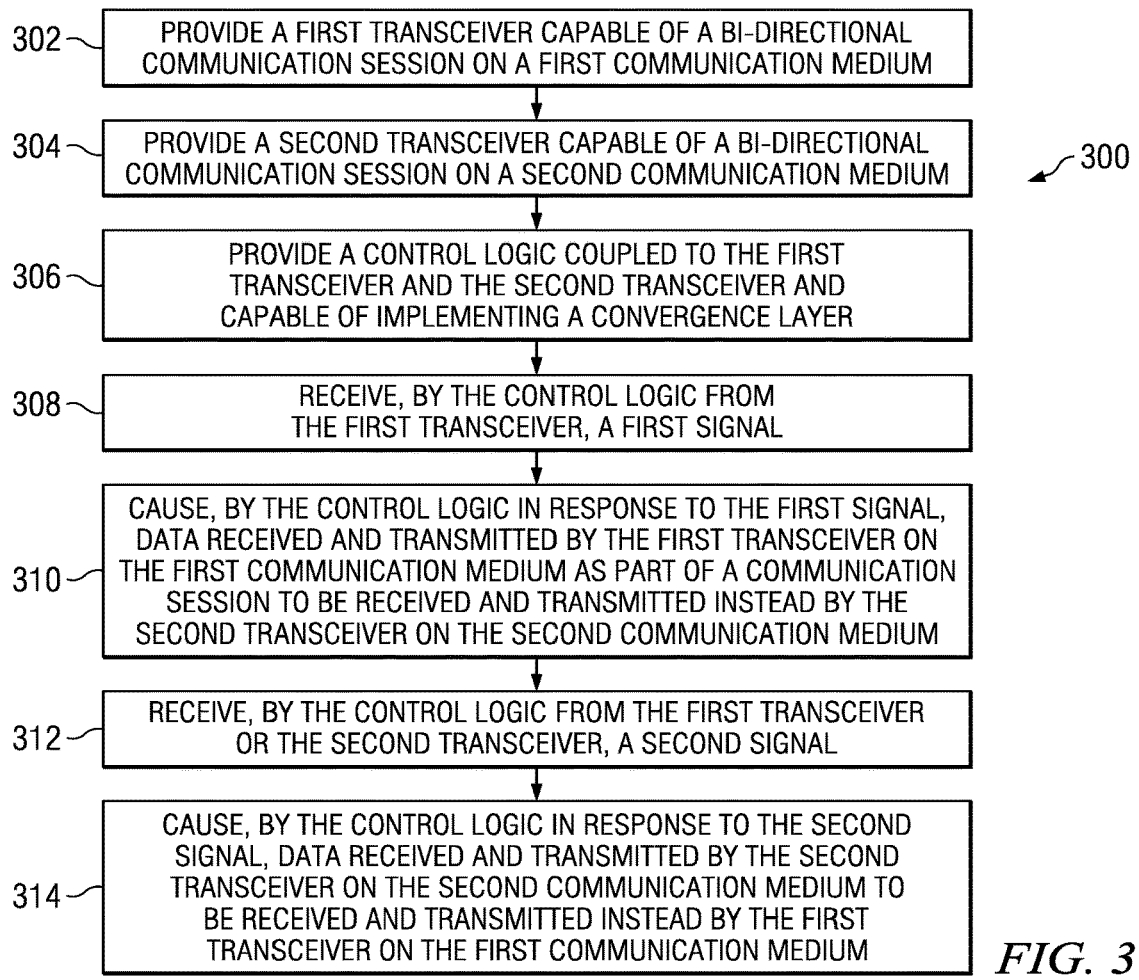
FIG. 3 shows a method for electronic communication according to an embodiment of the disclosure.

FIG. 3 shows a method 300 for electronic communication according to an embodiment of the disclosure. Some actions may be performed in a different order from that shown in FIG. 3, and two or more actions may be performed in parallel rather than serially. At block 302, a system may provide a first transceiver capable of a bi-directional communication session on a first communication medium. The system may be the system 200, the first transceiver capable of a bi-directional communication session may be the first PLC transceiver 206, and the first communication medium may be the PLC link 214.

At block 304, the system may provide a second transceiver capable of a bi-directional communication session on a second communication medium. The second transceiver may be the first RF transceiver 208, and the second communication medium may be the RF link 216.

At block 306, the system may provide a control logic coupled to the first transceiver and the second transceiver and capable of implementing a convergence layer. The control logic may be the first control module 218.

At block 308, the control logic may receive, from the first transceiver, a first signal.

At block 310, the control logic may cause, in response to the first signal, data received and transmitted by the first transceiver on the first communication medium as part of a communication session to be received and transmitted instead by the second transceiver on the second communication medium.

At block 312, the control logic may receive, from the first transceiver or the second transceiver, a second signal.

At block 314, the control logic may cause, in response to the second signal, data received and transmitted by the second transceiver on the second communication medium to be received and transmitted instead by the first transceiver on the first communication medium.

Certain features that are described in the context of separate embodiments can also be combined and implemented as a single embodiment. Conversely, various features that are described in the context of a single embodiment can also be implemented in multiple embodiments separately or in any suitable subcombinations. Moreover, although features may be described as acting in certain combinations and even initially claimed as such, one or more features from a combination as described or a claimed combination can in certain cases be excluded from the combination, and the claimed combination may be directed to a subcombination or variation of a subcombination. Although various aspects of the invention are set out in the independent claims, other aspects of the invention comprise other combinations of features from the embodiments and/or from the dependent claims with the features of the independent claims, and not solely the combinations explicitly set out in the claims. Certain functions that are described in this specification may be performed in a different order and/or concurrently with each other. Furthermore, if desired, one or more of the above-described functions may be optional or may be combined.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A device comprising:
   a first transceiver configured to receive a first signal indicating a quality of a first communication medium, wherein the first communication medium is a power line communication (PLC) medium and the first transceiver is a PLC transceiver;
   a second transceiver configured to receive a second signal indicating a quality of a second communication medium, wherein the second communication medium is different than the first communication medium; and
   a processor coupled to the first transceiver and to the second transceiver, the processor configured to:
      obtain data;
      switch from the first transceiver to the second transceiver in response to the first signal and the second signal; and
      instruct the second transceiver to transmit the data over the second communication medium.

2. The device of claim 1, wherein the second communication medium is a wireless medium, and the second transceiver is a wireless transceiver.

3. The device of claim 1, wherein the device is a first device and the second transceiver is configured to transmit the data to a second device.

4. The device of claim 1, wherein the first transceiver is further configured to receive a third signal indicating a quality of the first communication medium, the second transceiver is further configured to receive a fourth signal indicating the quality of the second communication medium, and the processor is further configured to switch from the second transceiver to the first transceiver in response to the third signal and the fourth signal.

5. The device of claim 1, wherein the first signal comprises a received signal strength indicator (RSSI) of the first communication medium.

6. The device of claim 1, wherein the first signal comprises a noise level of the first communication medium or a medium occupation ratio of the first communication medium.

7. The device of claim 1, wherein the first signal comprises statistics on packet error rates with different modulation schemes for the first communication medium or a number of packets having valid preambles and invalid payload cyclic redundancy checks (CRCs).

8. The device of claim 1, wherein the first transceiver is further configured to transmit a packet, and the first signal is a lack of an acknowledgment responsive to the packet.

9. The device of claim 1, wherein the first transceiver, the second transceiver, and the processor are in a system on a chip.

10. The device of claim 1, wherein the device is a smart meter.

11. A method comprising:
    receiving, by a first transceiver of a device, a first signal indicating a quality of a first communication medium, wherein the first communication medium is a power line communication (PLC) medium and the first transceiver is a PLC transceiver;
    receiving, by a second transceiver of the device, a second signal indicating a quality of a second communication medium, wherein the second communication medium is different than the first communication medium;
    obtaining, by a processor of the device, data;
    switching, by the processor from the first transceiver to the second transceiver, in response to the first signal and the second signal; and
    instructing, by the processor, the second transceiver to transmit the data over the second communication medium.

12. The method of claim 11, wherein the second communication medium is a wireless medium, and the second transceiver is a wireless transceiver.

13. The method of claim 11, wherein the device is a first device, the method further comprising transmitting, by the first device, the data to a second device.

14. The method of claim 11, further comprising:
    receiving, by the first transceiver, a third signal indicating a quality of the first communication medium;
    receiving, by the second transceiver, a fourth signal indicating the quality of the second communication medium; and
    switching, by the processor, from the second transceiver to the first transceiver in response to the third signal and the fourth signal.

15. The method of claim 11, wherein the first signal comprises a received signal strength indicator (RSSI) of the first communication medium.

16. The method of claim 11, wherein the first signal comprises a noise level of the first communication medium or a medium occupation ratio of the first communication medium.

17. The method of claim 11, wherein the first signal comprises statistics on packet error rates with different modulation schemes for the first communication medium or a number of packets having valid preambles and invalid payload cyclic redundancy checks (CRCs).

18. The method of claim 11, further comprising transmitting, by the first transceiver, a packet, and the first signal is a lack of an acknowledgment responsive to the packet.

19. The method of claim 11, wherein the first transceiver, the second transceiver, and the processor are in a system on a chip.

20. The method of claim 11, wherein the device is a smart meter.

\* \* \* \* \*